(12) United States Patent
Hori et al.

(10) Patent No.: US 7,782,922 B2
(45) Date of Patent: Aug. 24, 2010

(54) EXCIMER LASER DEVICE OPERABLE AT HIGH REPETITION RATE AND HAVING HIGH BAND-NARROWING EFFICIENCY

(75) Inventors: Tsukasa Hori, Ooiso-machi (JP);
Takanobu Ishihara, Hiratsuka (JP);
Kouji Kakizaki, Hiratsuka (JP)

(73) Assignees: Komatsu Ltd., Tokyo (JP); Ushio Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/071,048

(22) Filed: Feb. 14, 2008

(65) Prior Publication Data
US 2008/0198891 A1    Aug. 21, 2008

(30) Foreign Application Priority Data
Feb. 15, 2007    (JP) .............................. 2007-034777

(51) Int. Cl.
*H01S 3/22* (2006.01)
*H01S 3/223* (2006.01)
*H01S 3/03* (2006.01)

(52) U.S. Cl. .............................. 372/55; 372/57; 372/61

(58) Field of Classification Search ................... 372/61, 372/55, 57
See application file for complete search history.

(56) References Cited

U.S. PATENT DOCUMENTS

| 7,006,547 | B2 | 2/2006 | Steiger et al. |
| 2002/0154668 | A1* | 10/2002 | Knowles et al. ............... 372/55 |
| 2003/0048826 | A1* | 3/2003 | Bethel et al. .................. 372/55 |

FOREIGN PATENT DOCUMENTS

WO    2004/095661    11/2004

* cited by examiner

*Primary Examiner*—Minsun Harvey
*Assistant Examiner*—Patrick Stafford
(74) *Attorney, Agent, or Firm*—Wenderoth, Lind & Ponack, L.L.P.

(57) ABSTRACT

A narrow-band discharge excited laser device including a laser chamber having a laser gas sealed therein, a pair of electrodes provided within the laser chamber to face each other with a predetermined distance therebetween, a band-narrowing module having a magnifying prism and a grating and receiving laser light passing through a slit, and a cross-flow fan circulating the laser gas passing between the electrodes, in which a pulsed voltage is applied from a high-voltage power supply to the pair of electrodes to generate electric discharge between the electrodes, and the pair of electrodes have a width of 1 to 2 mm, a ratio between the electrode width and the inter-electrode distance (electrode with inter-electrode distance) being 0.25 to 0.125.

8 Claims, 15 Drawing Sheets

| | INTER-ELECTRODE DISTANCE a | ELECTRODE WIDTH | GAS FLOW RATE | FAN POWER | BUFFER GAS |
|---|---|---|---|---|---|
| a | 13mm | 2mm | 45m/sec | 4.5kW | Ne (NEON) |
| b | 8mm | 1mm | 50m/sec | 4.5kW | Ne (NEON) |
| c | 13mm | 2mm | 45m/sec | 3kW | He (HELIUM) |
| d | 8mm | 1mm | 50m/sec | 3kW | He (HELIUM) | a: INTER-ELECTRODE DISTANCE
b: ELECTRODE WIDTH

|   | INTER-ELECTRODE DISTANCE a | ELECTRODE WIDTH | GAS FLOW RATE | FAN POWER | BUFFER GAS |
|---|---|---|---|---|---|
| a | 13mm | 2mm | 45m/sec | 4.5kW | Ne (NEON) |
| b | 13mm | 2mm | 45m/sec | 3kW | He (HELIUM) |

OSCILLATION STAGE LASER a: INTER-ELECTRODE DISTANCE
b: ELECTRODE WIDTH

TOP VIEW

SIDE VIEW

VIEW AS VIEW FROM A-A

EXCIMER LASER DEVICE OPERABLE AT HIGH REPETITION RATE AND HAVING HIGH BAND-NARROWING EFFICIENCY

BACKGROUND OF THE INVENTION

1. Technical Field

The present invention relates to a narrow-band discharge excited excimer laser device and, in particular, to a narrow-band discharge excited excimer laser device for use in exposure devices, which is capable of high output, realizing high band-narrowing efficiency, and oscillating at a high repetition rate.

2. Related Art

It is believed that, as the technology node is further scaled down, for example for the technology nodes of 45 nm to 32 nm, double exposure techniques such as double patterning and increased NA (1.3 to 1.5) using immersion technique will become principal techniques for exposure devices using an ArF excimer laser as a light source.

The following are requirements for light sources for ArF laser exposure devices:

1. A high repetition rate (10 kHz or higher) and high average output (100 W or higher) are required to ensure high dose stability and to increase throughout;

2. Increased NA requires further narrowing down of super narrow band (spectral width of 0.3 pm or less at a spectral purity of 95%);

This requirement is due to miniaturization of worked patterns. In the present state of technology, a spectral line width of ArF laser is 0.5 to 0.35 pm at a purity of 95%. This trend of band-narrowing will be further enhanced in the future, and eventually a bandwidth of 0.2 pm or less will be required; and 3. The space coherence of output laser light is required to be low enough to reduce the effects of speckles on masks of the exposure devices.

In particular, for the double exposure technique which requires a wafer to be exposed twice, light-source output must be high in order to improve the productivity.

In order to satisfy these requirements, ArF excimer lasers used as a light source employ a double-chamber system in which two chambers are provided. This is because it is practically very difficult for a laser employing a single-chamber system to increase its output while maintaining desirable optical performance such as narrow spectral width, due to various restrictions relating to stable system operation, lifetime of modules and the like.

The double-chamber system is able to overcome the above-mentioned difficulty in practical application and to satisfy the industrial requirements as described above, by generating a laser beam having high optical performance with low output in a first chamber, referred to as oscillation stage, and amplifying the laser beam in a second chamber referred to as amplification stage.

The double-chamber systems are roughly classified into two types: MOPA (master oscillator power amplifier) type having no resonator mirror provided on the amplifier side, and MOPO (master oscillator power oscillator) type having a resonator mirror provided.

US Patent Application Publication No. 2002/0154668 describes a MOPA-type laser device.

The laser device described in US Patent Application Publication No. 2002/0154668 has a band-narrowing module provided in an oscillation stage laser (MO) for narrowing the band, so that laser light having a very narrow spectral width is output. This seed light is injected into an electric discharge area of an amplifier (PA) chamber to amplify the power, whereby a super narrow band and high output are realized.

WO 2004/095661 pamphlet proposes a MOPO-type laser device, in which seed light from an oscillation stage laser (MO) is injected into a low-coherence resonator of an amplification stage laser (PO).

Employing the low space coherence MOPO system, this laser device realizes higher amplification efficiency and a greater pulse width compared to the MOPA system, with the beam grade being kept equivalent to that of the MOPA system.

Examples of configuration of two-stage laser devices employing the double-chamber system are shown schematically in FIGS. 12A and 12B. FIG. 12A shows the MOPA system, and FIG. 12B shows the MOPO system.

In FIGS. 12A and 12B, a laser beam emitted by an oscillation stage laser (MO) 100 functions as a seed laser beam, and an amplification stage laser (PA) 200 or an amplification stage laser (PO) 210 has a function to amplify the seed laser light. Specifically, spectrum characteristics of the laser device as a whole are determined by spectrum characteristics of the oscillation stage laser 100, and laser output (energy or power) of the laser device is determined by the amplification stage laser 200 or 210.

In the MOPA-type laser device shown in FIG. 12A, the oscillation stage laser (MO) 100 and the amplifier (PA) 200 have laser chambers 101 and 201, respectively, which are filled with a laser gas. A pair of electrodes (not shown), which face each other and are spaced apart by a predetermined distance, are arranged within each of these chambers, so that electric discharge is generated by applying a high-voltage pulse to the pair of electrodes.

Further, window members (not shown) made of a material having transparency to laser oscillation light are provided in each of the chambers of the oscillation stage laser 100 and amplifier 200. A cross-flow fan (not shown) is disposed in the chambers 101, 201, so that the laser gas is circulated in the chambers 101, 201 to supply the laser gas to the electric discharge areas.

The oscillation stage laser 100 has a band-narrowing module (LNM) 300 composed of a magnifying prism 301 and a grating (diffraction grating) 302. A laser resonator is formed by the optical elements in the band-narrowing module 300 and a front mirror 102.

A laser beam (seed laser beam) from the oscillation stage laser 100 is guided and injected into the amplifier (PA) 200 through a beam propagation system 400 including a reflecting mirror. The laser beam is amplified in the amplifier (PA) 200 and output.

The amplifier (PA) 200 has no resonator mirror in the MOPA-type laser shown in FIG. 12A, whereas the amplification stage laser 210 in the MOPO-type laser shown in FIG. 12B is provided with a optically stable resonator composed, for example, of a rear mirror 211 and a front mirror 212 so that amplification is possible even with a low input. An injected seed laser beam is reflected between the front mirror 212 and the rear mirror 211 as indicated by the arrows, passing effectively through the electric discharge area to increase the power of the laser beam, and laser light is output from the front mirror 212.

As mentioned in the above, one of the requirements for a light source for ArF laser exposure devices is narrow spectral line width. In the present state of technology, the spectral line width of ArF laser is 0.5 to 0.35 pm at a purity of 95%. It is believed that this trend of band-narrowing will be further enhanced and eventually a width of 0.2 pm or less will be required.

However, further narrowing of the bandwidth will induce deterioration of the oscillation efficiency.

Further narrowing down of the currently available spectral purity width of 0.5 to 0.35 pm is required by the semiconductor exposure process as described above. However, if the bandwidth is further narrowed without improvement in the technology, the oscillation efficiency, particularly the band-narrowing efficiency of the excimer lasers will be deteriorated. The term "band-narrowing efficiency" as used herein means a ratio between a laser output when a band-narrowing module (LMN) is provided and a laser output when a high reflection mirror is provided instead of the band-narrowing module (LMN). Specifically, the band-narrowing efficiency is represented by the following equation.

[Band-narrowing efficiency]=[laser output when LNM is provided]/[laser output when high reflection mirror is provided]

This is for the reasons as follows. The band narrowing of an excimer laser is performed by the use of a band-narrowing module. The band-narrowing module is provided therein with a magnifying prism and a wavelength dispersion element (a diffraction grating is used in the figure), which together narrow the bandwidth of the excimer laser.

The wavelength dispersion element returns only light having a specific range of wavelength to the laser chamber to thereby amplify the light and narrow the bandwidth. In order to obtain light with a narrower spectral width, the beam magnifying power of the prism must be increased. However, if the beam magnifying power is increased without changing the length of the diffraction grating, the discharge width usable for amplification will become smaller. Accordingly, if the magnifying power is increased for further narrowing the bandwidth with the discharge width being left wide, it will impair the energy efficiency in the conversion from electric discharge input to laser. This is because the band-narrowing efficiency is deteriorated.

Conventionally, the diffraction grating length has been made greater as a measure for furthering the band narrowing while preventing the deterioration of the band-narrowing efficiency. However, it is difficult to produce a diffraction grating having a greater length than those currently available since the diffraction gratings are very precise components. Further, use of a longer diffraction grating will induce problems such as increased size of the band-narrowing module. Accordingly, it is difficult to produce a laser having a high band-narrowing efficiency while furthering the band-narrowing.

The excimer laser is a so-called pulse laser emitting light intermittently. Therefore, the laser output is represented as a product of energy per pulse and repetition rate. Accordingly, two different methods are conceivable for increasing the light source output in exposure devices.

One of them is a method of increasing the light source energy. The other is a method of increasing the repetition rate. Both these methods have advantages and disadvantages. It is determined which method is to be employed, depending on the difficulty in practice or the like.

One of the main problems in such methods is durability of optical elements. In an exposure device using deep ultraviolet light, optical elements thereof are highly likely to be damaged by light since deep ultraviolet light has high photon energy. In order to avoid such damage, the optical elements must have a high durability performance, and various measures are taken for that purpose.

It is a matter of course that the durability performance of the elements themselves need be improved, while measures are also taken to reduce the load to the elements. It is known that the damages to the optical elements are reduced by decreasing the period of time and the peak strength at the position of incidence of light on the optical elements.

Accordingly, the method of increasing the light source output by increasing the pulse energy increases the load to the optical element, and hence is not preferable in view of the lifetime of the optical elements. It is therefore believed that the method of increasing the laser output by increasing the repetition rate is more preferable in view of increasing the lifetime of the optical elements and hence of the exposure system as a whole and building up a stable system.

FIG. 13 is a cross-sectional view of a laser chamber of a discharge excited laser device.

The laser chamber 100 includes a cross-flow fan 121 for supplying flow of a laser gas between electrodes, a heat exchanger 122 for cooling the laser gas after electric discharge, an anode electrode 131 and a cathode electrode 132 for discharge excitation, and an air guide 123 for efficiently supplying the laser gas fed by the cross-flow fan 121 to between the electrodes.

An electric discharge space is pre-ionized by applying a voltage to a pre-ionization electrode 125 for a short period of time by a power supply. Then, electric current is caused to flow from the cathode electrode to the anode electrode to generate electric discharge.

An insulating ceramics 124 is additionally provided between the power supply 133 and the electrode 132, and the pre-ionization electrode 125 is provided in the vicinity of the electrode 131.

A voltage is applied to the pre-ionization electrode 125 by the power supply 133 to pre-ionize the electric discharge space, and then a pulse voltage is applied between the electrodes 131 and 132 to cause electric current to flow between the cathode electrode 132 and the anode electrode 132, thereby causing electric discharge to occur.

Light generated by the electric discharge and having a specific wavelength is selected and amplified by a resonator, whereby excimer laser is oscillated.

When the excimer laser is to be operated at a high operating frequency, discharge stability becomes a problem. In the excimer laser, as described above, the laser gas is excited by generating intermittent electric discharge so that the laser is oscillated. This intermittent discharge, however, cannot be obtained stably if the repetition rate is increased. It is believed that this is because when the repetition rate is increased, the electric discharge will change from normal glow discharge to arc discharge or streamer discharge, breaking the uniformity of the laser gain in the electric discharge, and making it impossible to ensure a gain length required for laser oscillation.

In order to increase the repetition rate in the excimer laser, it is most effective to narrow the discharge width. The maximum operable repetition rate in excimer lasers is usually explained in association with a clearance ratio (CR). The term CR refers to a ratio between a discharge width W and a product of a gas flow rate between electrodes represented by v and discharge interval time represented by t, that is, $CR=vt/W$. When the CR value is sufficiently great, the electric discharge will be stable and the laser is allowed to operate at a high repetition rate. If the CR is great, the electric discharge can be generated stably, and the stability in laser energy is also improved.

The CR can be explained as follows, based on physical phenomena.

Discharge products produced by electric discharge, such as ions and active species, and dust and debris derived from the electrodes remarkably reduce the discharge resistance of the gas. In addition, the electric discharge will produce a dilute gas region where the gas pressure is relative low and hence the discharge resistance is low. Accordingly, if such dilute-gas region (or discharge product) exists in the vicinity of the electrodes, the next electric discharge will be generated in this region instead of between the electrodes. Consequently, when the CR is great, it means that the discharge product is kept away from the vicinity of the electrodes during the occurrence of the next electric discharge. FIG. 14 is cross-sectional view of the vicinity of the electrodes, schematically illustrating normal electric discharge and abnormal electric discharge. In FIG. 14, the reference numerals 131 and 132 denote electrodes, and G denotes an inter-electrode gap.

A necessary CR value differs depending on usage of the laser. A CR of about two will suffice in an application where the level of the energy stability required for the laser is not so high. However, when the laser is used as a light source for semiconductor exposure, a high level of energy stability is required, and hence a CR of three or higher is necessary. Accordingly, if the laser is to be operated at 6 kHz with the discharge width being set to 3 mm, for example, the gas flow rate between the electrodes has to be about 50 m or more per second.

A description will be made of the double chamber system mentioned above. In the double-chamber system, the oscillation stage chamber encounters less technical difficulty in increasing the repetition rate in comparison with the amplification stage. This is because the output or energy required for the oscillation stage is generally low, and the oscillation stage can be designed to set low the energy density of output beams. If the energy density of output beams is high, it will damage the optical elements such as output mirrors and output windows, making it impossible to achieve the performances required in practice including the lifetime. The narrowing of the discharge width will reduce the width of a laser beam. Therefore, if the discharge width is narrowed to try to keep the same output energy, the energy density will be increased. An allowable discharge width for the oscillation stage is small, since the output energy is low. Conversely, an allowable discharge width for the amplification stage is apt to be great since the output energy is high. In order to avoid this, some double-chamber systems employ two amplification stage chambers. This is because a twice higher frequency can be achieved by alternately operating the two amplification stage chambers. For example, operation at 10 kHz is possible when the oscillation stage is operated at 10 kHz, while the two amplification stage chambers operating at 5 kHz are operated alternately.

One of possible measures for increasing the energy density is to set the inter-electrode distance great. Even if the beam width is narrowed, the cross section of a laser beam can be enlarged by setting the beam height greater by that much, and the energy density can be reduced. Conventionally, high repetition rate lasers have been designed in this manner.

FIG. 15 schematically shows a configuration example of a MOPA-type laser device employing two amplifiers (PA) described in U.S. Pat. No. 7,006,547. FIG. 15A is a side view and FIG. 15B is a top view of the amplifiers (PA).

The laser device shown in FIGS. 15A and 15B is a MOPA-type laser device which includes a single high-repetition oscillation stage laser (MO) and at least two amplifiers (PA) (several pairs of electrodes may be arranged in one and the same chamber), and is designed such that synchronous operation is achieved between the oscillation stage laser (MO) operating at a repetition rate, for example, of 4 kHz or higher and the amplifiers (PA) operating at a repetition rate, for example, of 2 kHz or higher In FIGS. 15A and 15B, the repetition rate of the oscillation stage laser 100 is for example 4 kHz or higher, and a laser beam 140A from the oscillation stage laser 100 is injected into the amplifier (PA) 200 via reflecting mirrors 240A and 240B.

The amplifier 200 is provided with two pairs of discharge electrodes 90A-92A and 90B-92B. These electrode pairs alternately generate electric discharge at a repetition rate for example of 2 kHz or higher. The injected laser beam is reflected by the reflecting mirrors 240B, 240C1, and 240C2 as shown in FIG. 15B to be amplified. The amplified laser light is output from the amplifier 200.

As mentioned in the above, a spectral line width of 0.2 pm or less at a purity of 90% will be required in the future.

As shown in FIGS. 12A and 12B and others, the band narrowing is carried out by means of a band-narrowing module (LNM). The LNM has a prism for expanding a laser beam and a diffraction grating for selecting a wavelength. When the spectral line width is to be narrowed, it is a common practice to employ a method for improving the wavelength dispersion of the diffraction grating, a method for increasing the laser beam magnifying power, or the like.

Although the grating density of the diffraction grating must be increased in order to improve the wavelength dispersion of the diffraction grating, it is very difficult to fabricate such a diffraction grating. Further, if the laser beam magnifying power is increased, the band-narrowing efficiency will be deteriorated unless the length of the diffraction grating is increased. However, it is difficult to fabricate a large-sized diffraction grating with high accuracy.

In the present state of technology, the practical limit of the length downsizing of a diffraction grating is about 350 mm when a diffraction grating having desirable reflection efficiency for the ArF wavelength (193 nm) is to be fabricated with high accuracy. If the laser beam magnifying power is increased without changing the length of the diffraction grating, the spectral line width is narrowed but the band-narrowing efficiency is deteriorated. This is because the width of the gain region used for laser oscillation is relatively narrowed by increasing the laser beam magnifying power. For example, when the magnifying power is doubled without changing the length of the diffraction grating, the spectral line width is reduced to two thirds, whereas the width of the gain region used for laser oscillation will be substantially halved and the output will be reduced to about a half.

Conventionally, the effort to narrow the bandwidth has been pursued by sacrificing the band-narrowing efficiency. However, the further band narrowing is possible without deteriorating the band-narrowing efficiency, if the width of the electrodes arranged in the laser chamber is reduced so that the discharge width, or the gain width is concentrated in the narrowed region. The concentration of the electric discharge to the narrowed region makes it possible to improve the band-narrowing efficiency by reducing the unusable region even when the band is further narrowed.

SUMMARY OF THE INVENTION

A primary problem to be solved for putting high repetition rate lasers into practical use is a problem of power requirement.

In order to increase the repetition rate of a laser, two measures will be possible in view of the clearance ratio (CR). For example, when the repetition rate of a laser operating at 6 kHz is to be increased to 12 kHz while at the same time ensuring the stability of laser energy, the CR can be set to two to three either by doubling the gas flow rate or by reducing the discharge width to a half.

The former of the two possible measures is much more difficult for putting the laser in practical use. This is because the doubling of the gas flow rate increases to eight times the power required by a motor for driving a fan producing gas flow. Estimating based upon the power used by currently available lasers, the power required for the motor will be 20 kW or more.

This power is comparable to the discharge input power used for laser oscillation, and is not allowable in view of the efficiency. In addition, the increased input means that the amount of heat generated in the device is high, which may impair the stability of the device.

Further, if the rotation rate of the motor is increased for the purpose of increasing the gas flow rate, it will also increase the vibration of the device. This vibration component will also impair the stability of the device, inducing another problem that insulation against vibration is required. Accordingly, in applications where high stability is required, such as a light source for a semiconductor exposure device, it is not realistic to increase the repetition rate of the laser by increasing the gas flow rate.

In order to realize a laser with a high repetition rate of 10 kHz or higher, it is practical to set the motor power in a practical range, while reducing the discharge width to set the CR in a required range. When assuming a laser suitable for practical use, the gas flow rate between the electrodes obtainable by the present state of technology is about 50 m/second. If the CR is set to 2 to 3, the required discharge width will be about 3 mm (2.8 to 4.2 mm) when the repetition rate is 6 kHz, and about 1.5 mm (1.4 to 2.1 mm) when 12 kHz.

Still another problem is how the discharge width is made in accordance with a designed value. A desired discharge width cannot always be obtained even if electrodes with a same width are used.

This is because the discharge width is strongly affected by the inter-electrode electric field. The inter-electrode electric field varies depending on the power supply performances (applied voltage, time change waveform of voltage, and so on), the surface shape, arrangement, and material of the electrodes, the arrangement of structures around the electrodes, the material of the structures, and the operation gas conditions (gas pressure and gas composition). The effects exerted by these parameters to the inter-electrode electric field differ in intensity, and the parameters also interact with each other. Moreover, the performances required for the laser (output, beam shape, beam divergence angle, and so on) depend on the configuration of the electric discharge area. Therefore, all these items should be considered when the laser is designed.

Conventionally, therefore, a trial-and-error approach has been required to find the optimum conditions to realize narrow-band electric discharge and to determine the configuration of the electric discharge area. This makes it impossible to make the discharge width in accordance with the designed value. Furthermore, the difference of the discharge width from the designed value must be absorbed by taking a measure such as increasing the required power to increase the gas flow rate.

As described above, the further band narrowing is made possible without deteriorating the oscillation efficiency by concentrating the discharge width, that is, the gain width to a narrow area.

However, it has not been clearly known by the prior art what configuration is required for narrowing the discharge width, and thus the configuration of the electric discharge area had to be determined by finding optimum conditions by trials and errors. As a result, the discharge width thus obtained did not always accord with the designed value.

On the other hand, there has recently arisen a demand for further band narrowing. The further band narrowing will induce deterioration of the oscillation efficiency. Therefore, there is a demand for an excimer laser device having a high band-narrowing efficiency.

The term "band-narrowing efficiency" as used herein means, as described above, a ratio between a laser output when a band-narrowing module (LMN) is mounted and a laser output when a high reflection mirror is provided in place of the band-narrowing module (LMN). The band-narrowing efficiency is therefore represented by the following equation.

[Band-narrowing efficiency]=[laser output when LNM is provided]/[laser output when high reflection mirror is provided]

The present invention has been made in order to solve the problems as described above. It is an object of the present invention to realize, in a discharge excited laser device for use in exposure devices, a discharge width narrower than a slit width of a band-narrowing module (LNM) for narrowing the spectral line width, and to provide a narrow-band laser for use in exposure devices, having a high band-narrowing efficiency.

As described above, an actual laser chamber has to be actually fabricated for final confirmation in order to obtain a desired discharge width. However, even such an effort is sometimes not successful in obtaining an electrode width according to the designed value.

The present inventors therefore have performed various experiments and studies and eventually have found that a discharge width can be obtained in accordance with a designed value regardless of structures or the like around the electric discharge area, by setting the electrode width and the electrode interval such that a ratio in a specific range is established therebetween. In addition, it has also been found that this also makes it possible to satisfy various laser performances.

This will be described in detail.

When the discharge width is narrowed to obtain a high band-narrowing efficiency or high repetition rate, the electric field of the electrodes is computed to estimate a discharge width, and to determine the width and shape of the electrodes. An adequate inter-electrode distance must be set for this purpose.

This is for preventing the electric discharge from being spread over. The electric discharge is generally generated along a region where the electric field is strong. When there are similar field intensities, the electric discharge will be generated so as to connect the electrodes by a shortest distance. Accordingly, the shape of excimer laser electrodes need be designed such that the electric field distribution between the electrodes is as uniform as possible to prevent the spreading of the electric discharge.

However, when a target discharge width is as small as 3 mm or less, the electric discharge will be spread out between the electrodes, especially around the middle between the electrodes if the inter-electrode distance is too great. This is because if the discharge width is reduced to 3 mm or less, the edge effect of the electrodes becomes nonnegligible and it becomes difficult to produce a generally uniform electric field.

In order to solve this problem, a design is required such that an electric field with higher intensity is generated between the electrodes and the electric discharge is generated to connect the electrodes in the shortest distance defined thereby.

In order to enhance the electric field intensity between the electrodes, it is most effective to set the inter-electrode distance small.

FIG. 5 shows an example of electric field computation. FIG. 5 shows a result of computation of spatial distribution of electric field intensity between the electrode when the electrode width is set to 2 mm and the inter-electrode distance is varied. The vertical axis of FIG. 5 represents inter-electrode distance (mm). The electric field intensity is standardized by a maximum value thereof, and the values of the electric field intensity are roughly indicated by densities of the lines.

It can be seen from FIG. 5 that the electric field intensity between the electrodes becomes greater as the inter-electrode distance is reduced. A description will be made of the encircled regions in FIG. 5. The electric field becomes weaker and its constraining force to the electric discharge is reduced as the distance from the electrodes is increased. In the case where the inter-electrode distance is 16 mm, the constraining force is substantially reduced in the encircled region, allowing the electric discharge to be spread out easily. In contrast, in the case where the inter-electrode distance is 10 mm, the electric field intensity will not be reduced substantially and hence the constraining force to the electric discharge is kept strong. Accordingly, the discharge width is not spread out, and the discharge width can be narrowed as designed.

FIG. 6 shows the measurement results of the discharge width and the distance between discharge electrodes obtained by an optical measurement method when the electrode width is set to 2 mm and 1 mm, and the inter-electrode distance is varied. In the measurement shown in FIG. 6, a cross-flow fan having a driving power of 5 kW or lower was used for circulating laser gas, and a pulsed voltage of 10 to 20 kV having a frequency of 10 kHz or higher was applied to the electrode pair from a high-voltage power supply.

It can be seen from FIG. 6 that the discharge width can be changed simply by varying the inter-electrode distance. As the inter-electrode distance is reduced, the discharge width tends to become saturated, and it will become narrower even if the inter-electrode distance is reduced to lower than a certain value. A similar tendency was observed also when a laser having a different peripheral structure was examined for comparison (indicated by white circles and black triangles). This means that the discharge width strongly depends on the inter-electrode distance, and hence a discharge width as desired can be obtained by setting the inter-electrode distance to an adequate value regardless of any other factors.

The discharge width mentioned above can be measured specifically in the following manner.

FIG. 7A shows an example of system configuration for measuring a discharge width W by the Mach-Zehnder method.

A coherent light flux from a pulse laser 401 is input to a beam expander 403 via a mirror 402, so that the beam is expanded by the beam expander 403 to be greater than the electric discharge area of the laser 400.

The expanded beam fluxed is bisected by a half mirror 404 into a light flux portion passing through a laser chamber 405 and a light flux portion not passing through the laser chamber 405. The former portion is input into the laser chamber 405 and the latter portion is input to a half mirror 408 via a high reflection mirror 410.

Discharge electrodes 406 are provided within the laser chamber 405, and a discharge voltage is applied to the discharge electrodes 406 to generate electric discharge, whereby the light input into the laser chamber 405 is caused to pass through the electric discharge area between the discharge electrodes 406 and is output.

The output light from the laser 400 is reflected by a high reflection mirror 407 and input to the half mirror 408 to be combined with the light which is input to the half mirror 408 via the high reflection mirror 410. The combined light is then input to a CCD camera 411 via an interference filter 409.

These two light flux portions, that is, the light flux portion passing through and the portion not passing through the laser chamber 405 interfere with each other to produce interference fringes. Specifically, when the pulse laser wavelength is indicated by $\lambda$, the peaks and valleys of the two light flux portions will overlap and attenuate each other to generate dark fringes if the optical path difference $\Delta$ is a value obtained by multiplying the half-wavelength $\lambda/2$ by an odd number, whereas they enhance each other to generate bright fringes if the optical path difference $\Delta$ is a value obtained by multiplying the half-wavelength $\lambda/2$ by an even number. If the optical path difference $\Delta$ is the same all over the image surface, the image will have uniform brightness.

As shown in FIG. 7B, when electric discharge is generated between the cathode electrode 406a and the anode electrode 406b, the electron density will be increased to change the refraction factor in the electric discharge area. Therefore, the width of the region in which distortion of the interference fringes occurs can be measured as a discharge width W with the use of an interferometer.

The discharge width may also be measured by a simple method, as shown in FIG. 8, in which an output coupling (OC) mirror 412 is disposed on the front side of the laser chamber 405 and a rear mirror 413 is disposed on the rear side, and the beam profile at the position of the OC mirror 412 during laser oscillation is imaged and measured with a CCD camera 416.

A transfer lens 415 forms an image of the beam at the position of the OC mirror 412 on the CCD camera 416 so that the image is measured. The discharge width may be defined either as $1/e$ or $1/e^2$ of the peak strength, for example.

Subsequently a practically preferable range of discharge width is determined based on the electric field intensity obtained by the computation (FIG. 5) and the discharge width actually measured (FIG. 6), while several restrictions are imposed to this determination.

Consideration will be given to the upper and lower limits of the inter-electrode distance.

A currently available laser (with a spectral purity width of 0.5 to 0.35 pm) has a band-narrowing efficiency of about 10%. The discharge width in this case is 3 to 3.5 mm. When taking into consideration the power, size, and lifetime of laser devices suitable for use in practice, a band-narrowing efficiency of 8% or less should be avoided. As described later, the band-narrowing efficiency is closely related to the discharge width when the spectral purity width is narrowed, and the band-narrowing efficiency is determined, according to the spectral purity width, by a ratio between the width of a slit provided in an LNM and the discharge width. A description will be made of how the discharge width and the band-narrowing efficiency are related to each other in order to determine the upper limit of the inter-electrode distance.

A currently available laser (with a spectral purity width of 0.5 to 0.35 pm) has a band-narrowing efficiency of about 10%. This corresponds to a discharge width of 3 to 3.5 mm in FIG. 6. When taking into consideration the power, size, and lifetime of laser devices suitable for practical use, it is difficult to reduce the band-narrowing efficiency any further.

Additionally, further band-narrowing is desired for lasers the repetition rate of which has been increased. In the present state of technology in which the length of diffraction gratings cannot be increased dramatically, the usable discharge width tends to be reduced.

In order to achieve a high resolution of 45 nm or less, as described above, the projection lens of an exposure device should have a high NA of one or higher, and a laser light source for immersion exposure devices using water is required.

Along with the increase in the NA of the projection lens, the requirement for the value of the spectral line width of the laser light source has become even more severe in order to make the effect of the chromatic aberration negligible.

For example, a value of 0.35 pm or less is required for the spectral width (E95) in which 95% of the total spectral energy is contained (the E95 width required for a conventional exposure device using no immersion is 0.50 pm or less).

A problem as described below has arisen in order to satisfy the required spectral width specification.

In order to narrow the spectral line width, there has arisen a necessity to increase the size of the grating provided in the band-narrowing module (LNM) and at the same time to increase the beam magnifying power of the prism beam expander provided in the LNM.

The LNM performance may be improved in the following manner for the purpose of narrowing the spectral line width.

(1) The width of the grating in the direction of the grooves may be increased.

However, since some of the gratings are highly accurate components, there is a limit to the grating size that can be manufactured.

(2) The beam magnifying power of the prism may be increased.

Since there is a limit to the grating size, the effective slit width of the LNM will be narrower than the laser discharge width if the magnifying power is increased. As a result, the light associated with the electric discharge that is spread wider than the effective slit width of the LNM will be blocked by the slit, leading to substantial deterioration of the band-narrowing efficiency. For this reason, even if a two-stage laser system (of MOPA or MOPO-type) is employed, the energy supplied to the power supply of the oscillation stage laser (MO) becomes very high, giving a serious effect on the lifetime of the oscillation stage laser (MO).

FIGS. 9A through 9C show an example of optical arrangement of a discharge excited narrow-band laser outputting laser light having a narrow spectral line width.

FIG. 9A is a top of the discharge excited narrow-band laser device, FIG. 9B is a side view of the same, and FIG. 9C shows relation between electric discharge and an LNM slit as viewed in a cross section taken along A-A in FIG. 9B.

The narrow-band laser device is composed of a laser chamber 11 and a band-narrowing module (LNM) 3. There are provided, in the laser chamber 11, an output coupler (OC) 14 functioning to output a laser beam externally and to return feedback light to a laser resonator, and a discharge electrode 1a for exciting a laser gas. There are provided in the band-narrowing module (LNM) 3, a prism beam expander 3a and a grating 3b for selecting a spectrum. The arrangement is made such that the dispersion direction of the LNM substantially matches the direction perpendicular to the orientation of the discharge electrode 1a in the laser chamber 11. The slit 13 of the LNM 3 is arranged such that the aperture is less than the inter-electrode distance in the electric discharge direction, while the aperture is set in accordance with a selected range of wavelength of the LNM in the direction perpendicular to the electric discharge direction.

Electric discharge is generated between the discharge electrodes 1a by applying a pulsed high voltage to the discharge electrodes 1a in the laser chamber 11, whereby the laser gas is excited.

Emitted light is input to the slit 13 of the LNM 3 through a window 12b. The beam passing through the slit 13 is expanded by the prism beam expander 3a at a magnifying power M, and input to the grating 3b at an angle close to the blaze angle.

The grating 3b is arranged in a Littrow arrangement, so that a light beam having a wavelength with the same diffraction angle as the incidence angle is again compressed by the prism beam expander and passes through the slit 13. The beam then passes through the electric discharge space between the discharge electrodes 1a through the window 12b and is amplified. This amplified light reaches the OC 14 through the window 12a. A part of the light, or transmitted light is output as laser light, while reflected light is returned as feedback light to pass through the electric discharge space via the window and is amplified. The amplified light is input to the slit 13 of the LNM 3, and similar processes are repeated.

FIG. 9C shows the relation among the discharge electrodes, the electric discharge area (solid line) and the aperture (broken line) of the slit 13 of the LNM 3 as viewed from the direction A-A. A laser beam that is usable effectively is substantially defined by a ratio between the aperture of the slit 13 of the LNM 3 and the electric discharge area, while the electric discharge area blocked by the slit does not contribute to laser oscillation.

FIG. 10 shows results of a test conducted to examine the relation between the slit width of the LNM 3 and spectral line width (E95), by using the laser device shown in FIGS. 9A through 9C.

These test results were obtained by measurement under the following conditions.

(1) The discharge width of the laser chamber was set to about 3 mm.

(2) The grating having 94 grooves per mm, a blaze angle of 78.9 degrees, and a length of 360 mm was provided in the LNM 3.

(3) As for the magnification factor of the prism beam expander and the slit width level, the magnification factor of the prism beam expander was changed from 70× to 23× as the slit width is changed from 1 mm to 3 mm, and the spectrum profile was measured with a high-resolution beam splitter.

As seen from the test results in FIG. 10, the spectral width E95 increased monotonously from 0.2 pm to 0.6 pm when the slit width was in a range from 1 mm (magnification factor of 70×) to 3 mm (magnification factor of 23×).

Thus, in order to obtain a target spectral line width E95 of 0.35 pm or less, the slit width LNM 3 must be 2 mm or less.

In conclusion from the foregoing, the slit width of the band-narrowing module (LNM) has to be 2 mm or less in order to obtain a target spectral line width E95 of 0.35 pm or less. When the slit width is set to 2 mm or less so that the discharge width is 2 mm or less, the entire of a laser beam is allowed to pass through the slit, and hence the band-narrowing efficiency can be improved.

Since the conventional laser devices have a spectral purity width of 0.5 to 0.35 pm, as described above, it can be seen from FIG. 10 that the slit width of the LNM is 2 to 2.7 mm. The discharge width in this case is 3 to 3.5 mm, and a band-narrowing efficiency of 10% can be achieved. Accordingly, if the discharge width is 3 to 3.5 mm, the upper limit of the inter-electrode distance can be determined, based on the fact that it is practically allowable to narrow the bandwidth to 0.35 pm, that is, to set the LNM slit width to 2 mm, and that, according to the present invention, the bandwidth narrowing is performed targeting to 0.35 pm or less. Specifically, when the upper limit of the discharge width is 3 to 3.5 mm, it can be determined from FIG. 6 that the upper limit of the electrode interval is 16 mm when the electrode width is 2 mm.

Based on the foregoing, when the upper limit of the discharge width is set to 1 to 1.2, it can be determined from FIG. 6 that the upper limit of the electrode interval is 16 mm when the electrode width is 2 mm.

Consequently, when taking into consideration the stability of electric discharge and the oscillation efficiency, it will be desirable to set the upper limit of the inter-electrode distance to 16 mm when the electrode width is 2 mm, and to 8 mm when the electrode width is 1 mm.

Next, consideration is given to a lower limit of the inter-electrode distance. As seen from FIG. 6, as the inter-electrode distance is reduced, the discharge width becomes smaller to approach to an ideal value. If the discharge starting voltage is fixed, the electric field intensity between the electrodes is also increased proportionally. It may seem that the inter-electrode distance should be as small as possible, but it is not true.

Firstly, as seen from FIG. 6, even if the inter-electrode distance is reduced, the discharge width only approaches to a specific value, and it makes no sense if the electrode interval is reduced extremely. Therefore, it is presumable that an appropriate value exists for the inter-electrode distance. Secondly, it will become impossible to obtain laser output if the inter-electrode distance is reduced excessively.

The laser output is basically proportional to the cross-sectional area of the electric discharge. Therefore, if the electrode interval is reduced too much, it will become impossible to obtain a desired energy level. Thirdly, there is a problem of air-flow resistance between the electrodes. If the inter-electrode distance is made too small, it will hinder the gas flowing between the electrodes, making it impossible to obtain a desired gas flow rate. Accordingly, if the inter-electrode distance is made too small, it will reduce the gas flow rate and impair the discharge stability, resulting in adverse effect on achieving the original target.

As seen from FIG. 6, when the electrode width is 2 mm, the discharge width will not vary significantly even if the inter-electrode distance is set to 8 mm or less. Accordingly, when taking into consideration the laser output and the gas-flow resistance between the electrodes, the inter-electrode distance should desirably be set to 8 mm or greater.

Although not shown in FIG. 6, it was confirmed by the experiment that, when the electrode width is 1 mm, the discharge width did not change significantly even if the inter-electrode distance was set to 4 mm or less. Accordingly, when taking into consideration the laser output and the gas-flow resistance between the electrodes, the inter-electrode distance should desirably be set to 4 mm or greater when the electrode width is 1 mm.

Although the description above has been made on the cases in which the electrode width is 1 mm and 2 mm, it is believed that similar tendency will be observed also when the electrode width is between 1 mm and 2 mm.

Based on the computation and experiment results described above, it can be concluded that when the width of the electrode pair is 1 to 2 mm in a high-repetition rate narrow-band discharge excited excimer laser device designed to generate electric discharge between the electrode pair by applying a pulsed voltage of 10 to 20 kV with a frequency of 10 to 20 kHz from a high-voltage power supply to the electrode pair, the inter-electrode distance and the electrode width are desirably set to a range as follows.

The inter-electrode distance is desirably set to 8 to 16 mm when the electrode width is 2 mm, whereas the inter-electrode distance is desirably set to 4 to 8 mm when the design discharge width is 1 mm.

Further, it is believed that same tendency will be observed when the electrode width is between 1 mm and 2 mm, or the electrode width is less than 1 mm or more than 2 mm. Accordingly, the ratio between the electrode width and the inter-electrode distance (referred to as the aspect ratio) should be from 2:8 to 2:16 (from 0.125 to 0.25).

Specifically, the electrode width and the electrode interval are determined so as to be contained in the shaded area shown in FIG. 11A. The term "electrode width" as used herein means a width of a curve intended for electric discharge. More specifically, the "electrode width" is a width of an electric discharge face (a part of the electrode where generation of electric discharge is presumed, or where generation of electric discharge is intended). Some examples are shown in FIG. 11B. When the electrode takes shapes as shown in FIG. 11B, D indicates the electrode width. Some of the electrodes used in excimer laser devices may have different electrode widths between the cathode side and the anode side. In such a case, the electrode width is defined by the greater one.

If the inter-electrode gap is designed appropriately, it will significantly contribute to stabilization of electric discharge during high repetition rate operation. Specifically the discharge resistance can be optimized with respect to the discharge width by appropriately setting the ratio between the inter-electrode distance and the electrode width, whereby it is made possible to generate electric discharge in a form as designed, even if there is a certain degree of disturbance such as insufficient gas flow rate. This will be described in more detail below.

As illustrated in FIG. 14, if a discharge product exists in the vicinity of electric discharge region, no electric discharge will be generated between the discharge electrodes, causing abnormal electric discharge, which will impair the laser energy stability. It depends on the difference in discharge resistance whether the electric discharge is generated between the electrodes as designed, or abnormal electric discharge is generated in a region where a discharge product exists.

Accordingly if the discharge resistance of the region between the electrodes is lower than that of the region where the discharge product exits, the electric discharge can be generated stably even if the CR is low, that is, a discharge product exists in the vicinity of the electrodes. When the inter-electrode distance is reduced to enhance the inter-electrode field intensity, it means to reduce the discharge resistance. Therefore, it is effective means for stabilizing the laser output when the repetition rate is increased.

In this regard, care should be taken how to determine the electrode width. It is effective to narrow the electrode width to improve the high repetition characteristic and the oscillation efficiency when the bandwidth is narrowed, but it also has a disadvantage of decreasing the lifetime of the electrodes.

The lifetime of the electrodes determines the lifetime of the laser chamber. When the electrodes come to the end of their lifetime, the entire laser chamber including the electrodes must be replaced. Laser chambers are generally expensive and time-consuming to replace. Therefore, the lifetime of the electrodes, that is, the lifetime of the laser chamber is an important factor to determine the performance of the laser device as an industrial machine.

When it is assumed that the supplied energy is fixed, the lifetime of the electrodes is inversely proportional to the electrode width. The lifetime of the electrodes used in presently available excimer lasers is determined by damages to the anode electrode. The anode electrode is damaged by chemical reaction with fluorine in proportion to the number of laser shots. The anode electrode will lose its function as an electrode when the depth of the damage reaches a certain level, and the oscillation efficiency of the laser is deteriorated.

If the supplied energy is the same and the number of laser shots is also the same, the depth of the damage will be greater when the electrode width is narrow than when it is wide, since the volume in which the chemical reaction takes place is constant. Therefore, from the standpoint of the lifetime of the electrodes, it is more desirable to use wider electrodes. For example, when the discharge width is intended to be 0.6 mm, it can be achieved by setting the electrode width to 1 mm and the inter-electrode interval to 16 mm, while it also can be achieved by setting the electrode width to 2 mm and the electrode interval to 8 mm. In such a case, the latter is more desirable since the electrodes have twofold lifetime performance. Consequently, when determining an electrode width and an electrode interval, it is important from the viewpoint of the lifetime of the laser device to compute a desirable electrode width while taking into consideration a targeted operation repetition rate and spectral line width, and then to select a maximum electrode width contained in the shaded area shown in FIGS. 11A to 11B.

Based on the foregoing, the present invention solves the problems described above in the following manner:

(1) In a narrow-band discharge excited laser device which includes a laser chamber having a laser gas sealed therein, a pair of electrodes provided within the laser chamber to face each other with a predetermined distance therebetween, a band-narrowing module having a magnifying prism and a grating and receiving laser light passing through a slit, and a cross-flow fan circulating the laser gas passing between the electrodes, and is designed such that a pulsed voltage is applied from a high-voltage power supply to the pair of electrodes to generate electric discharge between the electrodes, the width of the pair of electrodes are set to 1 to 2 mm, and a ratio between the electrode width and the inter-electrode distance (electrode with inter-electrode distance) is set to 0.25 to 0.125;

(2) In the paragraph (1) above, the width of the slit of the band-narrowing module is set to 2 mm or less;

(3) In the paragraphs (1) and (2), the repetition rate of the pulsed voltage applied to the pair of electrodes is set to 10 to 20 kHz; and (4) The narrow-band discharge excited laser device described in the paragraphs (1) to (3) is used as an oscillation stage laser of a two-stage laser device having an oscillation stage laser (MO) and an amplifier (PA) or an amplification stage laser (PO).

Advantageous effects as follows can be obtained according to the present invention:

(1) The discharge width can be set to a desired value as designed by setting the electrode width to 1 to 2 mm and setting the aspect ratio between the electrode width and the electrode interval to 0.25 to 0.125;

This enables stable oscillation at a high repetition rate without deteriorating the band-narrowing efficiency. The need is also eliminated to increase the power supplied to the motor for driving the fan for generating gas flow;

(2) The discharge resistance can be optimized with respect to the discharge width by setting the aspect ratio between the electrode width and the electrode interval to 0.25 to 0.125. This makes it possible to generate electric discharge in a form as designed even if there is a certain degree of disturbances such as insufficient gas flow rate. This also significantly contributes to stabilization of the electric discharge during high repetition rate operation; and (3) The discharge excited laser device according to the present invention can be used as an oscillation stage laser in a two-stage laser device having an oscillation stage laser (MO) and an amplifier (PA) or amplification stage laser (PO), so that the oscillation stage laser (MO) can be operated stably at a frequency of 10 kHz or higher without deteriorating the band-narrowing efficiency.

DETAILED DESCRIPTION OF THE INVENTION

Figure 1:
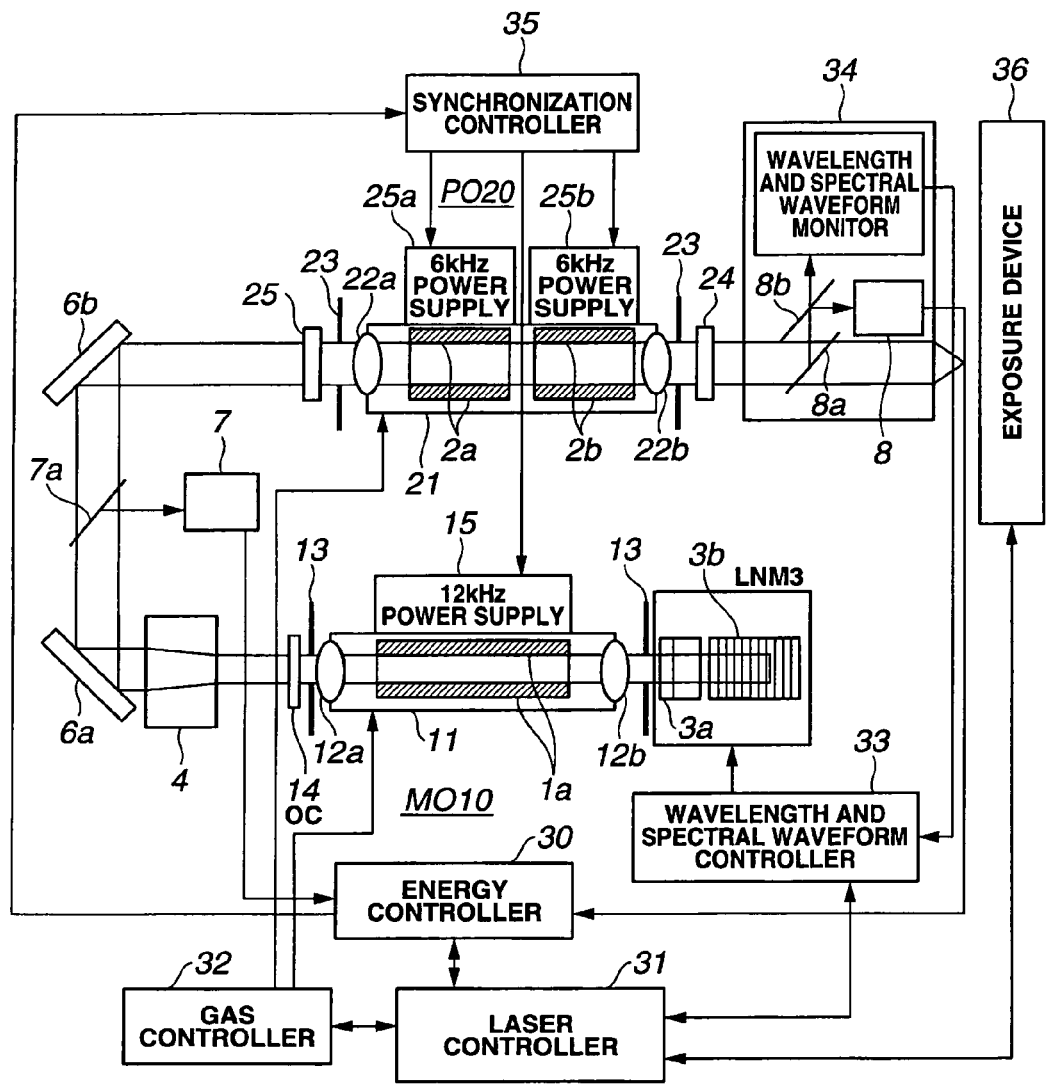
FIG. 1 is a diagram showing a configuration example of a MOPO-type laser device to which the present invention is applied.

Embodiments of the present invention will be described. FIG. 1 shows a configuration example in which the present invention is applied to a MOPO-type laser device employing a double-chamber system.

As shown in FIG. 1, the MOPO-type laser device has an oscillation stage laser (MO) 10 for outputting laser light with a narrow spectral line width, and an amplification stage laser (PO) 20 for amplifying and oscillating the laser light from the oscillation stage laser (MO) 10 by means of an optical resonator. The laser light from the MO is injected into the amplification stage laser 20 via a beam expander 4 for expanding the beam in the direction of the discharge gap and two high reflection (HR) mirrors 6a and 6b.

The oscillation stage laser (MO) 10 has a band-narrowing module (hereafter, sometimes referred to as the "LNM") 3 provided therein with a prism beam expander 3a and a grating (diffraction grating) 3b, and a laser resonator is formed by these optical elements in the band-narrowing module 3 and an output coupler mirror (OC) 14.

A pair of discharge electrodes 1a are provided within a chamber 11, and the electrodes 1a are connected to a power supply 15 generating a pulsed voltage of 10 kHz or higher, for example of 12 kHz.

The amplification stage laser (PO) 20 has a stable resonator formed of an output coupler mirror (OC) 24, a laser chamber 21, and a rear mirror 25, and is provided in the chamber 21 with two electrode pairs comprising an electrode pair 2a and another electrode pair 2b. These two electrode pairs 2a and 2b are respectively connected to power supplies 25a and 25b generating a pulsed voltage of 6 kHz, for example.

As described above, the amplification stage laser (PO) 20 is provided with two electrode pairs, so that the electrode pairs 2a and 2b alternately generate electric discharge. In this manner, the repetition rate of the electric discharge by each of the electrode pairs in the amplification stage laser (PO) 20 can be made a half of the repetition rate in the oscillation stage laser (MO) 10. Further, the cross-sectional area of the electric discharge generated by one of the electrode pairs in the amplification stage laser (PO) 20 can be made greater than that in the oscillation stage laser (MO) 10. This makes it possible to reduce the energy density of the optical elements used in the PO resonator of the amplification stage laser (PO) 20.

The oscillation stage laser (MO) 10 has: window members 12a and 12b arranged at opposite ends of an extension of the optical axis of the electrode pair 1a disposed within the chamber 11; and slits 13 for waveform shaping arranged at the respective sides of the window members 12a and 12b. On the other hand, the amplification stage laser (PO) 20 also has: window members 22a and 22b arranged at opposite ends of an extension of the optical axis of the two electrode pairs 2a and 2b disposed within the chamber 21; and slits 23 for waveform shaping arranged at the respective sides of the window members 22a and 22b.

A wavelength and spectral waveform monitor 34 and a power monitor 8 detect the optical quality and pulse energy of light output from the amplification stage laser (PO) 20, and a power monitor 7 detects the pulse energy of light from the oscillation stage laser (MO) 10.

A wavelength and spectral waveform controller 33 controls the wavelength and spectral waveform of laser light emitted by the amplification stage laser (PO) 20 based on the output from the wavelength and spectral waveform monitor 34. An energy controller 30 controls the pulse energy of the laser based on the output from the power monitors 7 and 8.

A gas controller 32 controls laser gas in the oscillation stage laser (MO) 10 and the amplification stage laser (PO) 20. A laser controller 31 controls the laser at large. A synchronization controller 35 controls the discharge timing of two power supplies 25a and 25b connected to the amplification stage laser (PO) 20 and of the power supply 15 connected to the oscillation stage laser (MO) 10.

As described above, the oscillation stage laser (MO) 10 has the LNM 3 in which there are provided a prism beam expander 3a and a grating (diffraction grating) 3b for narrowing the spectral line width. The dispersion direction (i.e., the beam expanding direction of the prism) of the grating (diffraction grating) 3b disposed in the LNM 3 is arranged perpendicularly to the discharge direction of the electrodes.

Figure 11A:
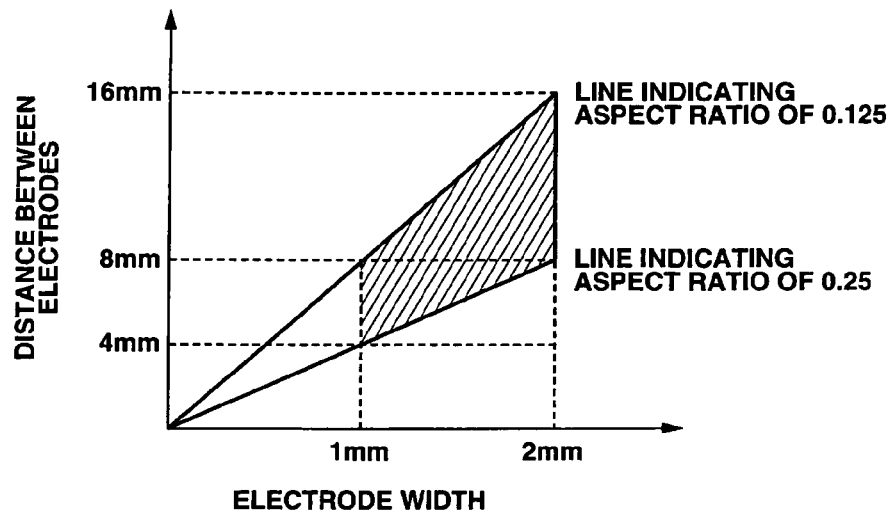
FIGS. 11A and 11B are diagrams for explaining a range of values that can be taken by the electrode width and the electrode interval.
Figure 11B:
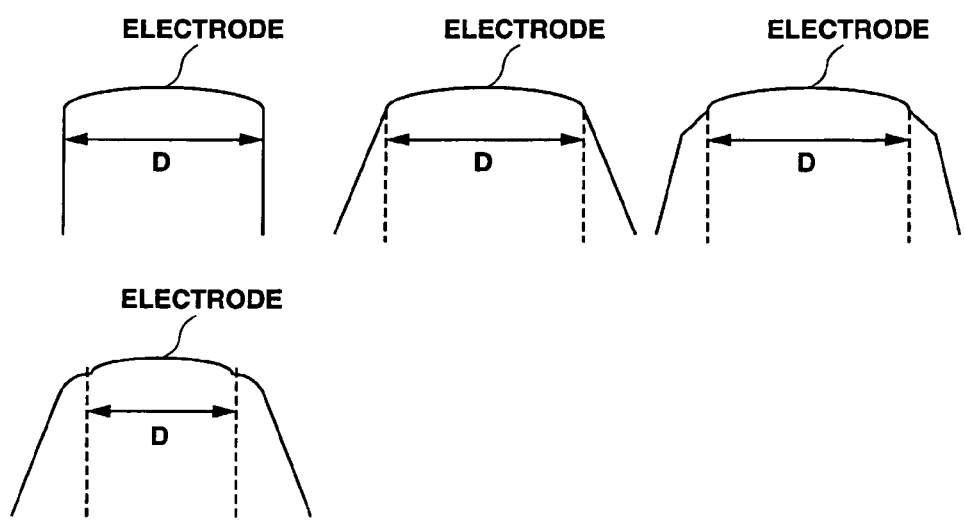
Figure 12A:
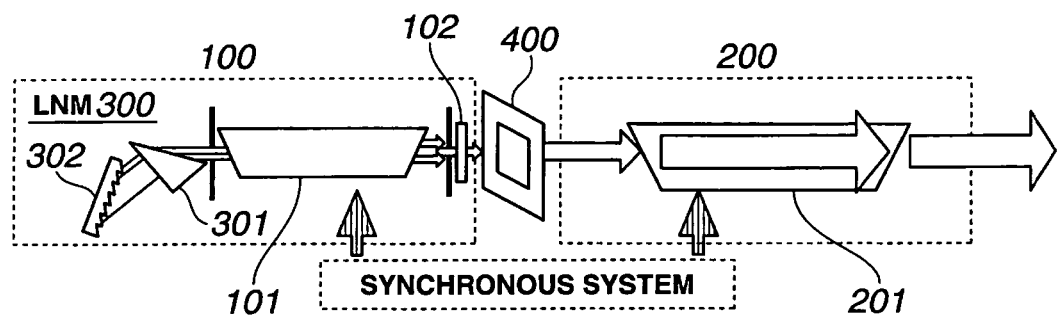
FIGS. 12A and 12B are diagrams schematically showing configuration examples of a two-stage laser device.
Figure 12B:
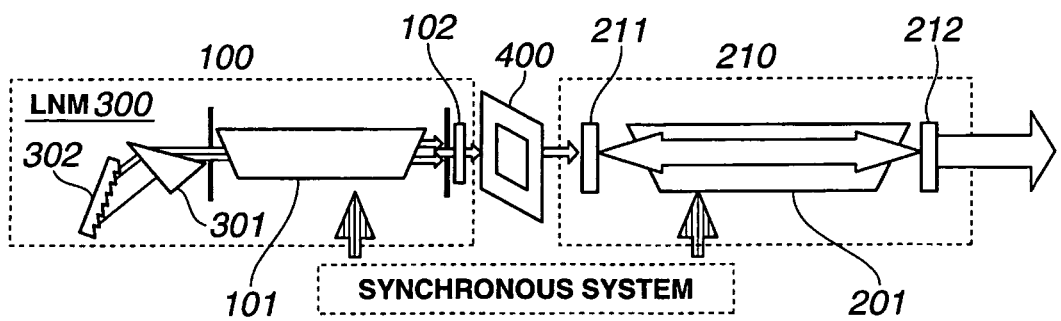
Figure 13:
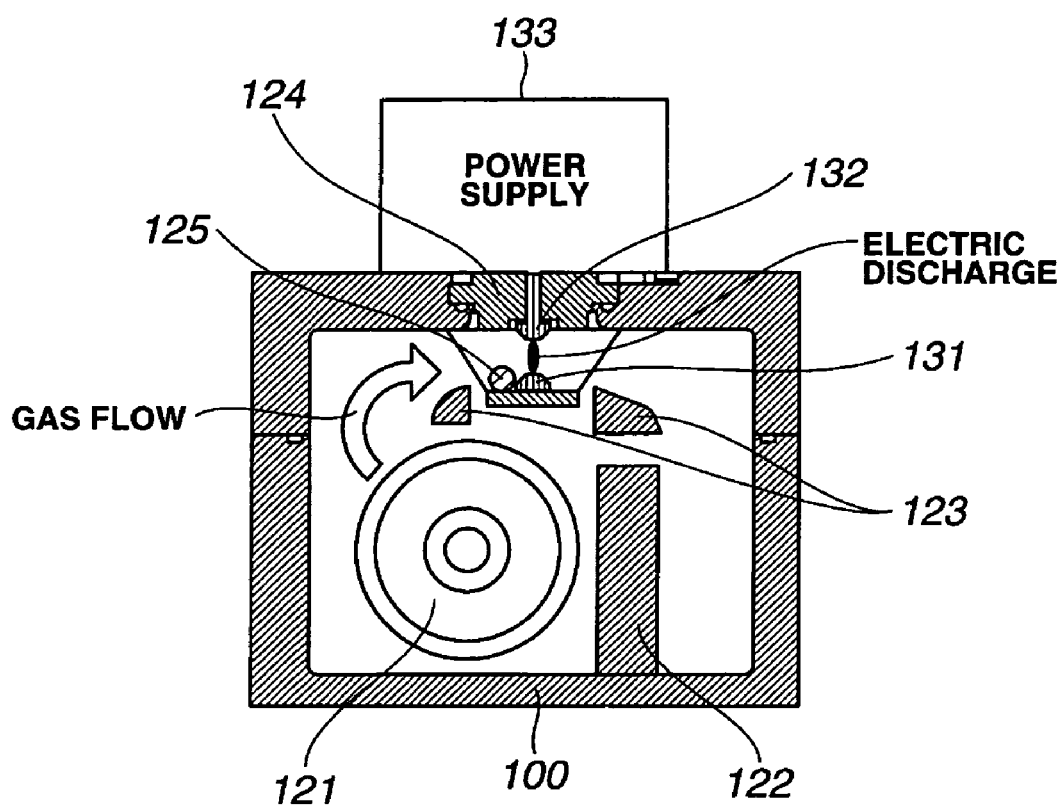
FIG. 13 is a cross-sectional view of a laser chamber of a discharge excited laser device.
Figure 14:
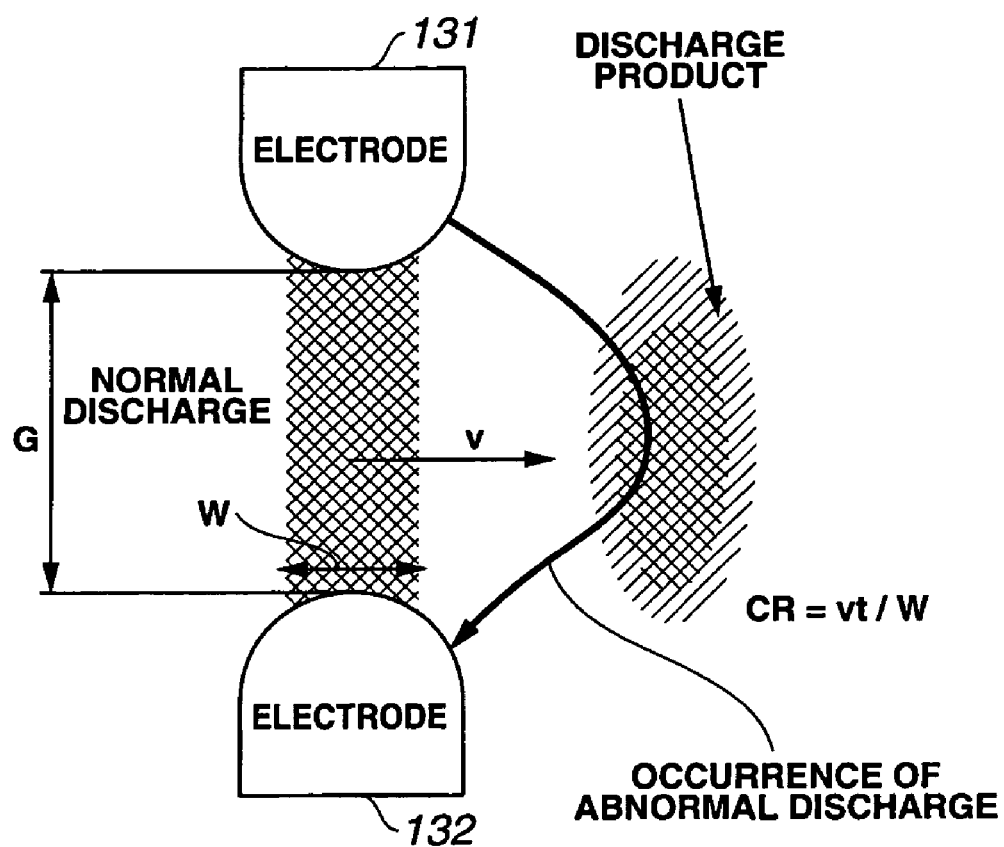
FIG. 14 is a diagram schematically showing a cross section of an electrode region, for illustrating normal electric discharge and abnormal electric discharge.
Figure 15A:
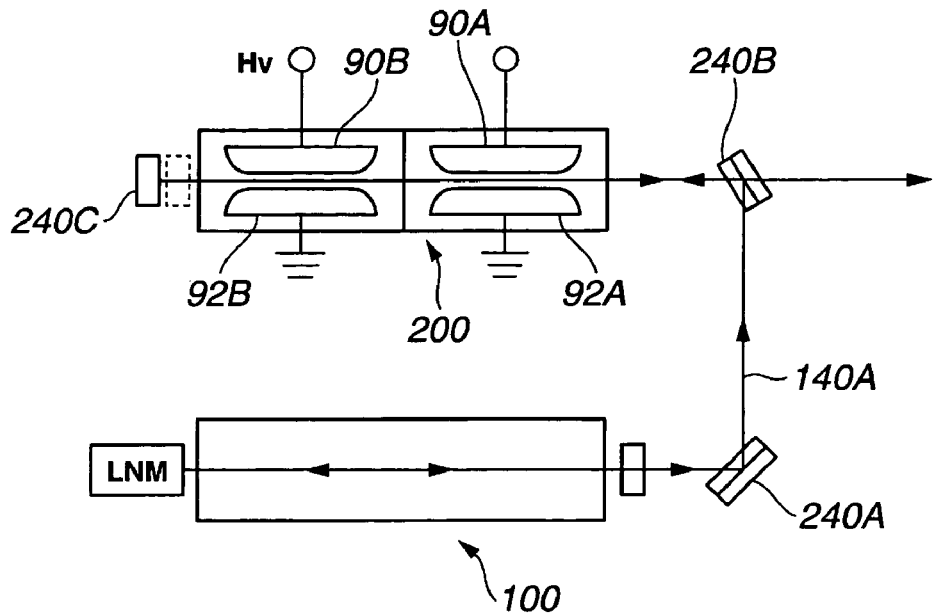
FIGS. 15A and 15B are diagrams schematically showing a configuration example of a MOPA-type laser device using two amplifiers (PA).
Figure 15B:
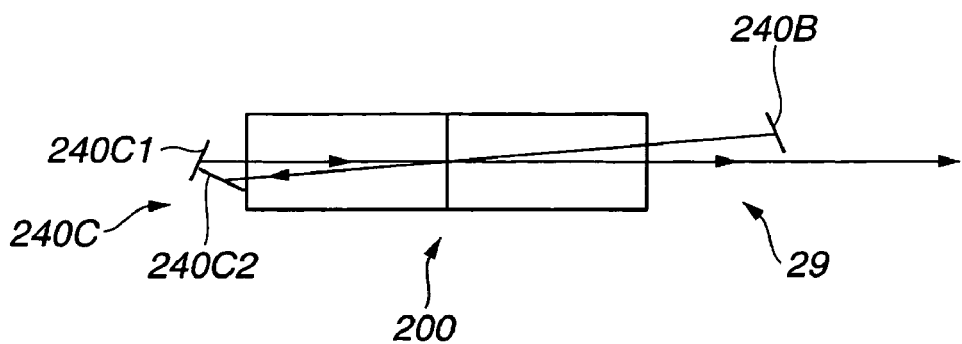

The interior of the laser chamber 11 is filled with a buffer gas, Ar gas, and F2 gas. Further, the laser chamber 11 is provided therein with a cross-flow fan for supplying a laser gas between the electrodes as shown FIGS. 11A to 11B, and a heat exchanger (not shown) for cooling the laser gas after electric discharge.

Electric discharge is generated between the discharge electrode pair 1a provided in the chamber 11 by applying a pulsed voltage from a power supply 15 to the electrode pair, and ArF excimer is produced by being excited by the electric discharge. Light with a wavelength of 193 nm is emitted when the ArF excimer is divided into Ar gas and F.

The light with a wavelength of 193 nm is selected by the LNM 3, whereby the spectral width is narrowed from about 400 pm to 0.1 pm. The band-narrowed laser light is output from the output coupler mirror (OC) 14 of the oscillation stage laser (MO) 10. The oscillation stage laser (MO) performs pulse oscillation at a repetition rate of 12 kHz. The time width of the laser light emission pulse of the oscillation stage laser (MO) is about 30 ns.

The light output from the oscillation stage laser (MO) 10 is then input into the beam expander 4 where it is expanded such that the beam width thereof becomes equal to the electrode gap of the amplification stage laser (PO) 20. The light output from the beam expander 4 is injected, via the two high reflection (HR) mirrors 6a and 6b, into the stable resonator having the output coupler mirror (OC) 24, the laser chamber 21, and the rear mirror 25 of the amplification stage laser (PO) 20.

There are provided, between the two mirrors 6a and 6b, a beam splitter 7a and a power monitor 7 for monitoring the pulse energy of the oscillation stage laser (MO) 10.

A detected value of the pulse energy of the oscillation stage laser (MO) 10 is input to the energy controller 30. Based on the result of detection of the pulse energy of the oscillation stage laser (MO) 10, the energy controller 30 transmits a control signal to the 12-kHz power supply 15 via the synchronization controller 35.

Two pairs of the electrodes 2a and 2b (hereafter, also referred to as the electrode pairs 2a and 2b) are arranged in series in the laser chamber 21 of the amplification stage laser (PO) 20, and these two electrode pairs 2a and 2b are connected to power supplies 25a and 25b, respectively.

When the light emitted from the oscillation stage laser (MO) 10 is injected into the optical resonator of the amplification stage laser (PO) 20, synchronously therewith, the power supplies 25a and 25b are operated alternately so that electric discharge is generated alternately between the electrode pairs 2a and 2b. The injected light is thus amplified and oscillated in the optical resonator, and the amplified light is output as laser light from the output coupler mirror (OC) 24 to an exposure device 36.

The output light is sampled by beam splitters 8a and 8b, so that the pulse energy is detected by the power monitor 8. The detection result is supplied to the energy controller 30.

Based on the detection result, the energy controller 30 transmits a control signal to the 6-kHz power supplies 25a and 25b of the amplification stage laser (PO) 20 and to the 12-kHz power supply 15 of the oscillation stage laser (MO) 10, by way of the synchronization controller 35.

The light output from the amplification stage laser (PO) 20 is sampled by the beam splitter 8b, so that the wavelength and the spectral waveform are detected by the wavelength and spectral waveform monitor 34.

The detection result is transmitted to the wavelength and spectral waveform controller 33, which transmits a control signal to a mechanism (not shown) provided in the LNM 3 for changing the incidence angle of the grating 3b so as to control the wavelength.

The spectral waveform can be controlled by controlling the optical wavefront (not shown) of the optical elements in the laser resonator of the oscillation stage laser (MO) 10. The spectral waveform also can be controlled by controlling the F2 gas concentration in the laser chamber 11 of the oscillation stage laser (MO) 10 by the gas controller 32.

The laser controller 31 gradually supplies or discharges the laser gas (F2, Ar, and the buffer gas) to or from the gas controller 32, according to time change in voltage applied by the power supply 15, voltage applied by the two power supplies 25a and 25b, and pulse energy of the amplification stage laser (PO) 20 and the oscillation stage laser (MO) 10.

The electrode width of the oscillation stage ArF laser in the double-chamber system was set to 2 mm and the inter-electrode distance to 8 mm. Ne was used as the buffer gas, and the gas flow rate was set to 45 m/sec (the driving power of the fan motor was set to 4.5 kW) so that the output energy was 1.5 mJ. As a result, stable oscillation was obtained at 10 kHz or higher while achieving a band-narrowing efficiency of 18%.

Figure 2:
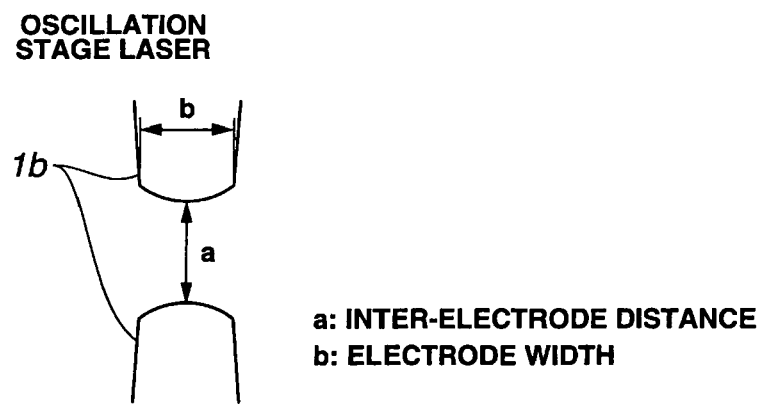
FIG. 2 is a diagram showing examples of values of the electrode interval, the electrode width, the gas flow rate and so on when the present invention is applied to the laser device shown in FIG. 1.

The present invention was applied to the MOPO-type ArF laser device employing the double chamber system as described above, in which the slit width of the LNM 3 of the oscillation stage laser (MO) 10 was set to 2 mm or less, while the electrode interval a, the electrode width b, the gas flow rate, and the buffer gas of the oscillation stage laser (MO) 10 were determined as shown in FIG. 2, and the laser device was operated at an oscillation frequency of 10 kHz. As a result, stable oscillation could be obtained at a high repetition rate without deteriorating the band-narrowing efficiency.

(1) As shown in the row (a) in the table shown in FIG. 2, the electrode width of the oscillation stage ArF laser of the double-chamber system shown in FIG. 1 was set to 2 mm, and the inter-electrode distance was set to 13 mm.

Ne (neon) was used as the buffer gas, and the gas flow rate was set to 45 msec (the driving power of the fan motor was set to 4.5 kW) so that the output energy was 1.5 mJ. As a result, stable oscillation was possible at 10 kHz.

(2) As shown in the row (b) in the table of FIG. 2, the electrode width of the oscillation stage ArF laser of the double-chamber system shown in FIG. 1 was set to 1 mm and the inter-electrode distance was set to 8 mm.

Ne (neon) was used as the buffer gas, and the gas flow rate was set to 50 m/sec (the driving power of the fan motor was set to 4.5 kW) so that the output energy was 1 mJ. As a result, stable oscillation was possible at 12 kHz.

(3) As shown in the row (c) in the table of FIG. 2, the electrode width of the oscillation stage ArF laser of the double-chamber system shown in FIG. 1 was set to 2 mm and the inter-electrode distance was set to 13 mm.

He (helium) was used as the buffer gas, and the gas flow rate was set to 45 msec (the driving power of the fan motor was set to 3 kW) so that the output energy was 1.5 mJ. As a result, stable oscillation was possible at 10 kHz.

(4) As shown in the row (d) in the table of FIG. 2, the electrode width of the oscillation stage ArF laser of the double-chamber system shown in FIG. 1 was set to 1 mm and the inter-electrode distance was set to 8 mm.

He (helium) was used as the buffer gas, and the gas flow rate was set to 50 msec (the driving power of the fan motor was set to 3 kW) so that the output energy was 1 mJ. As a result, stable oscillation was possible at 12 kHz.

Figure 3:
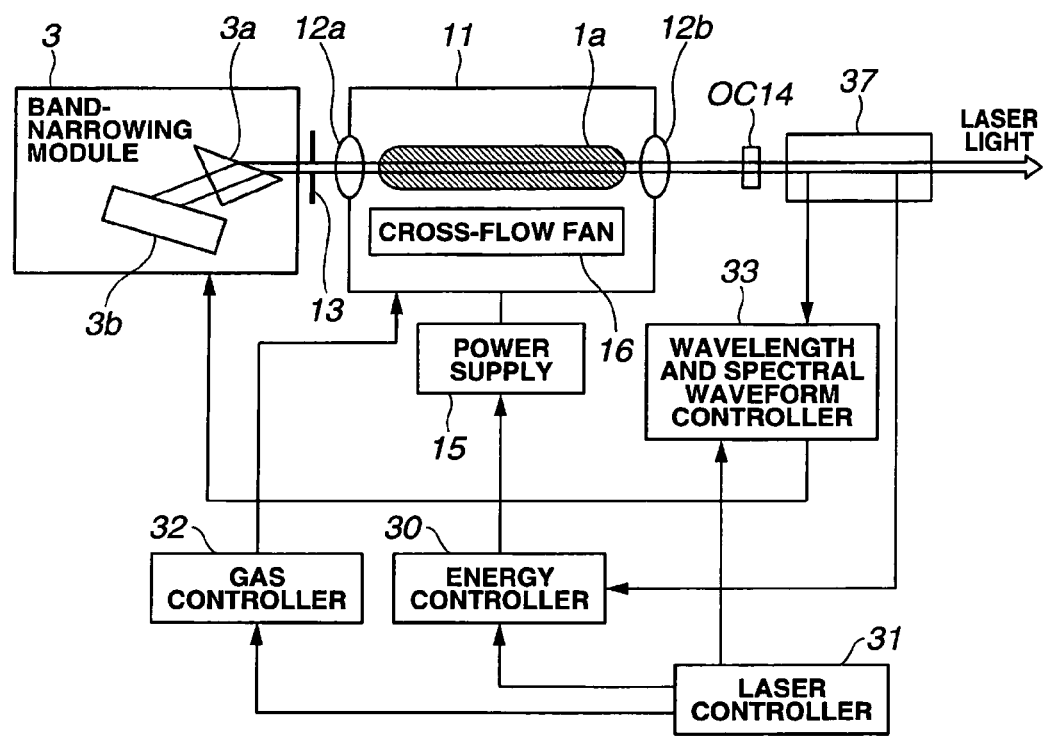
FIG. 3 is a diagram showing a configuration example of a single-chamber laser device to which the present invention is applied.

FIG. 3 shows a configuration example in which the present invention is applied to a single-chamber excimer laser device having a band-narrowing module.

In FIG. 3, the interior of a laser chamber 11 is filled with a laser gas. A pair of electrodes 1a (only one of the electrodes is shown in FIG. 3) are disposed within the laser chamber 11 to face each other with a predetermined distance therebetween. A high-voltage pulse is applied to the electrode pair 1a by a power supply 15, so that electric discharge is generated between the electrodes 1a and the laser gas is thereby excited in this electric discharge area.

A laser beam is generated by the excited laser gas. There are further provided, in the laser chamber 11, a cross-flow fan 16 and a heat exchanger (not shown). The laser gas is circulated in the laser chamber 11 by the fan 16, and the laser gas heated through the electric discharge is heat-exchanged to be cooled by the heat exchanger.

Window members 12a and 12b are arranged to form a Brewster angle in the windows of the laser chamber 11. The electrode pair 1a has an anode electrode and a cathode electrode which are spaced from each other by a predetermined distance in a direction perpendicular to the sheet surface.

A laser resonator comprises a grating (diffraction grating) 3b provided in the band-narrowing module (LNM) 3 and an output coupler mirror (OC) 14. The above-mentioned laser beam is output as a laser beam from the OC 14 after reciprocating between the grating (diffraction grating) 3b and a magnifying prism 3a provided in the band-narrowing module 3, and between the electric discharge area and the OC 14. The laser beam emitted from the OC 14 is injected into a monitor module 37 in which the pulse energy, central wavelength and so on are measured.

The band narrowing is achieved by providing the band-narrowing module (LNM) 3, and the spectral bandwidth narrowing is realized by selecting a wavelength by means of the diffraction grating.

The pulse energy data measured by the monitor module 37 is transmitted to an energy controller 30. Based on this data, the energy controller 30 transmits a control signal to the power supply 15.

The wavelength and spectral waveform measured by the monitor module 37 are transmitted to a wavelength and spectral waveform controller 33. The wavelength and spectral waveform controller 33 controls the wavelength by transmitting a control signal to a mechanism (not shown) for changing the incidence angle of the grating 3b in the LNM 3.

The spectral waveform is controlled by controlling the optical wavefront (not shown) of the optical elements in the laser resonator. The spectral waveform can also be controlled by controlling the F2 gas concentration in the laser chamber 11 by means of a gas controller 32.

A laser controller 31 causes the gas controller 32 to control the supply and discharge of the laser gas (F2, Ar and buffer gas) according to time change in the voltage applied to the power supply 15 and the pulse energy.

The electrode width of the ArF laser device shown in FIG. 3 was set to 2 mm, and the inter-electrode distance was set to 8 mm. Ne was used as the buffer gas, and the gas flow rate was set to 45 msec (the driving power of the fan motor was set to 4.5 kW) so that the output energy was 5 mJ. As a result, stable oscillation could be obtained at 10 kHz or higher while achieving a band-narrowing efficiency of 18%.

Figure 4:
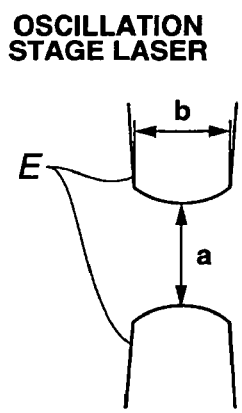
FIG. 4 is a diagram showing examples of values of the electrode interval, the electrode width, the gas flow rate and so on when the present invention is applied to the laser device shown in FIG. 3.
Figure 5:
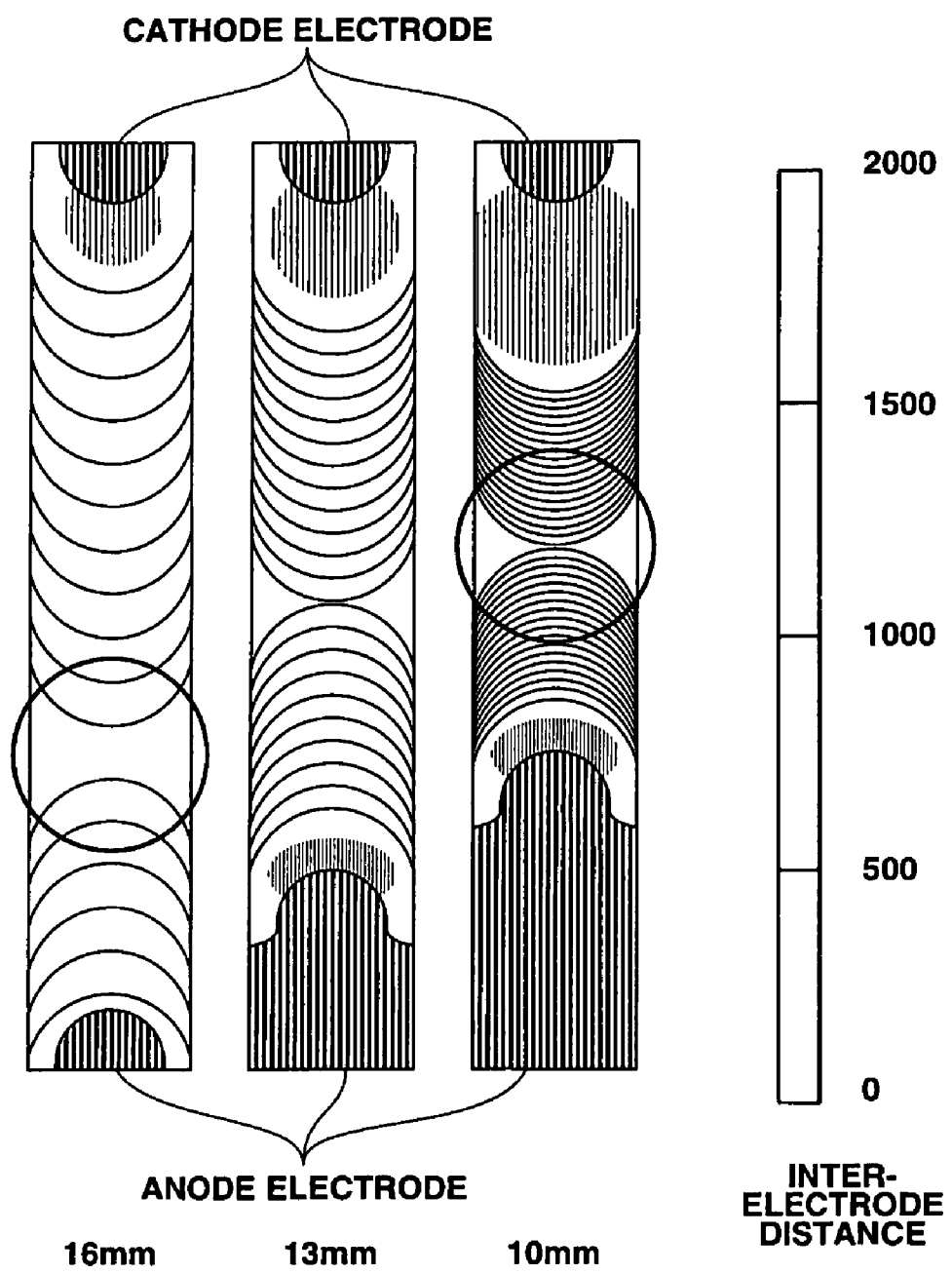
FIG. 5 is a diagram showing computation results of spatial distribution of the electric field intensity between electrodes.
Figure 6:
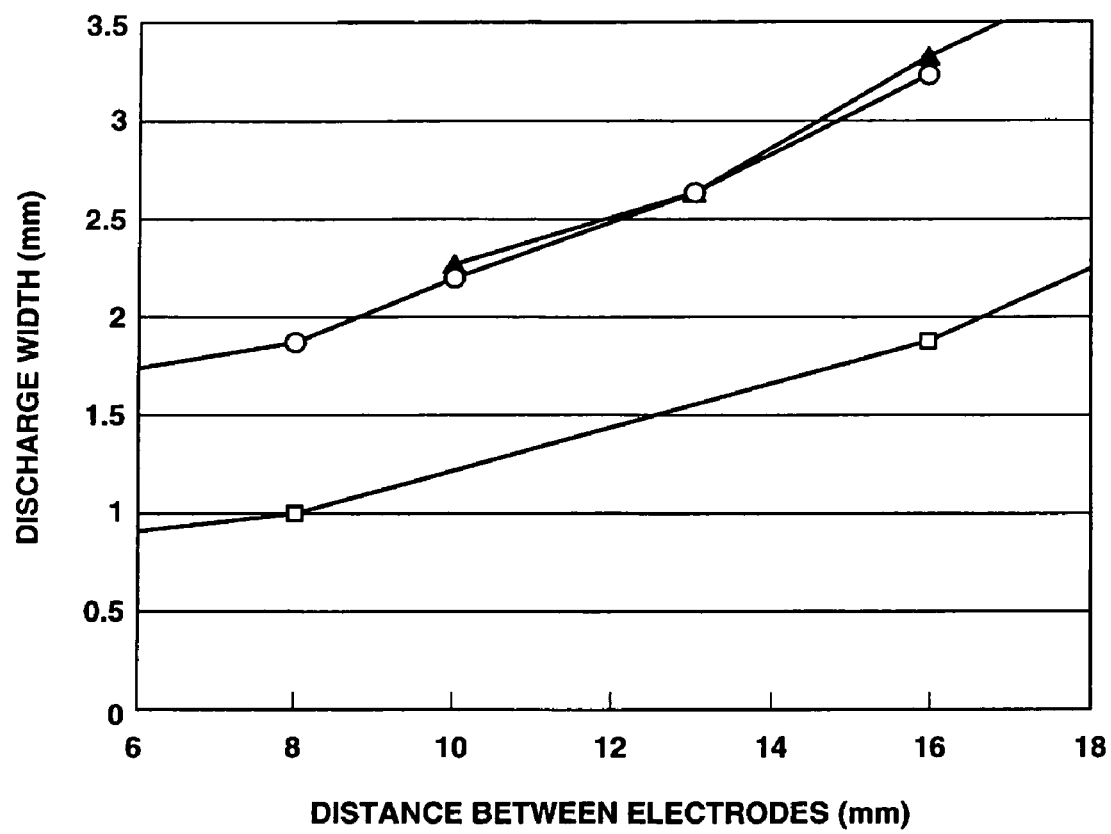
FIG. 6 is a graph showing measurement results of the discharge width and the inter-electrode distance obtained by an optical measurement method when the electrode width is set to 2 mm and 1 mm and the inter-electrode distance is varied.
Figure 7A:
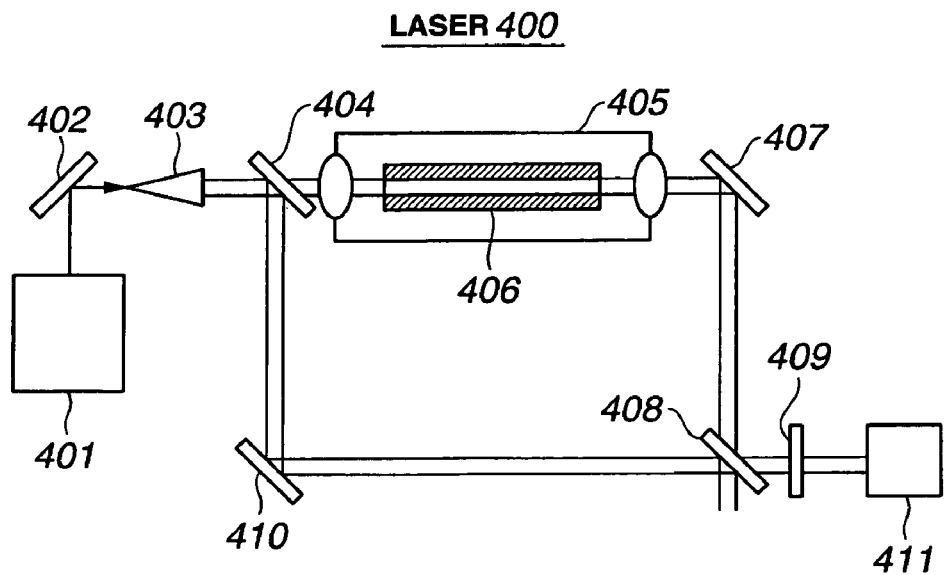
FIGS. 7A and 7B are diagrams showing a configuration example of a system for measuring a discharge width W by the Mach-Zehnder method.
Figure 7B:
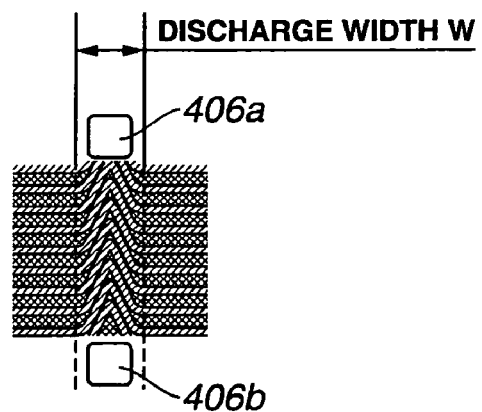
Figure 8:
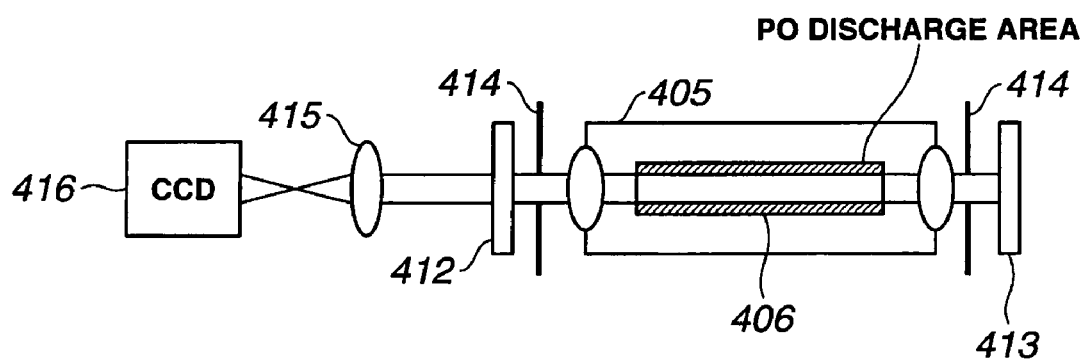
FIG. 8 is a diagram illustrating a simple method of measuring the discharge width W.
Figure 9A:
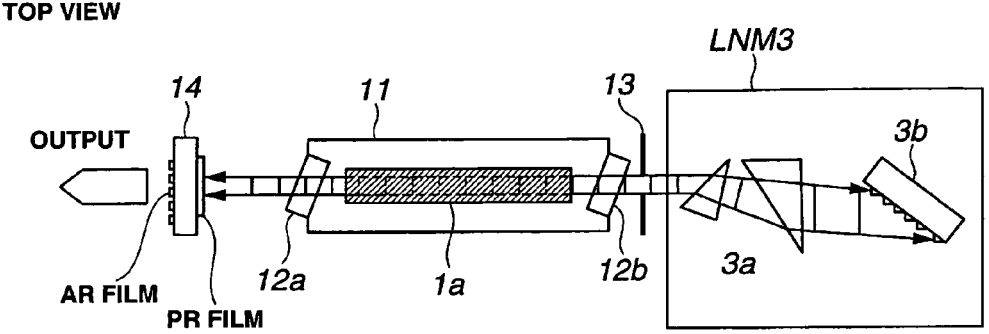
FIGS. 9A to 9C are diagrams showing an example of optical arrangement of an discharge excited narrow-band laser for outputting laser light with a narrow spectral line width.
Figure 9B:
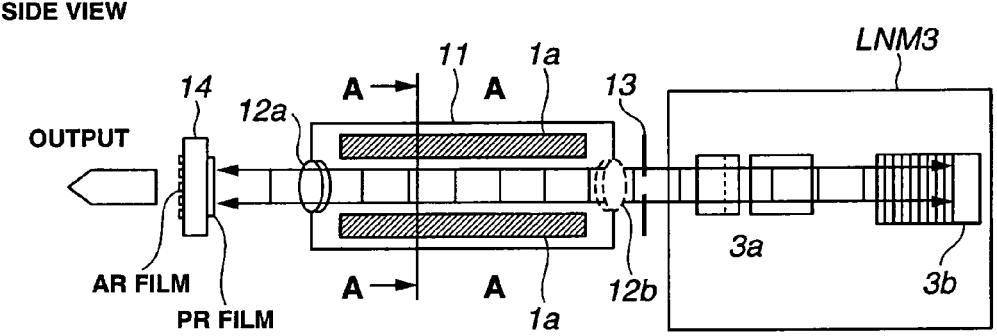
Figure 9C:
Figure 10:
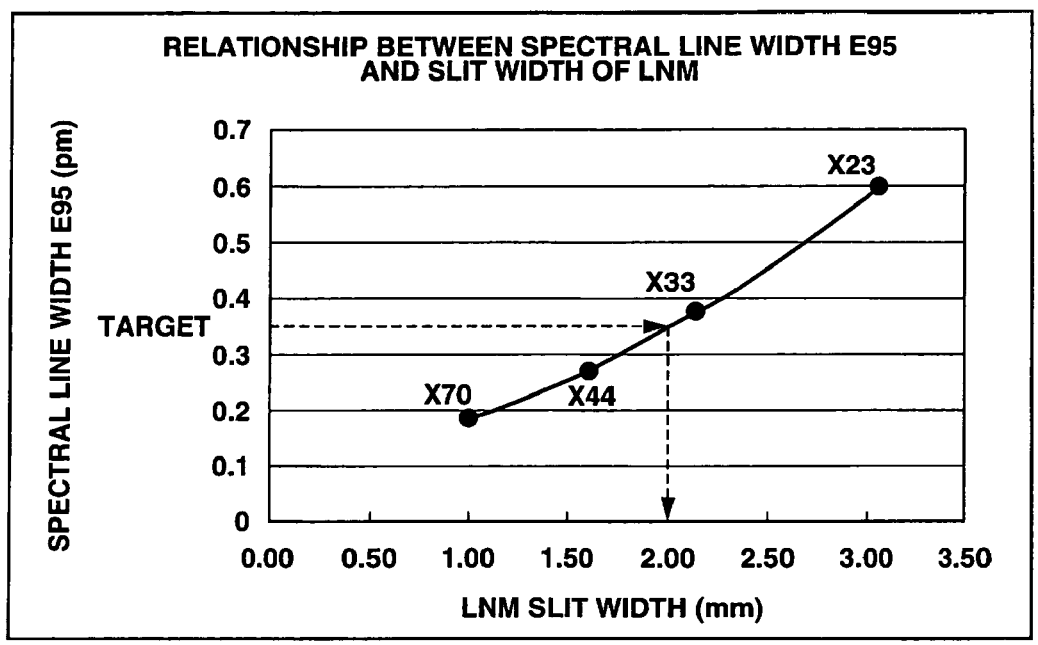
FIG. 10 is a graph showing relation between slit width of the LNM 3 and spectral line width (E95), obtained as results of a test conducted on the laser device shown in FIGS. 9A to 9C.

The present invention was applied to the ArF laser device having the configuration as described above, in which the slit width of the LNM 3 of the oscillation stage laser (MO) 10 was set to 2 mm or less, while the electrode interval a, the electrode width b, the gas flow rate, and the buffer gas were selected as shown FIG. 4, and the laser device was operated at an oscillation frequency of 10 kHz. As a result, stable oscillation could be obtained at a high repetition rate without deteriorating the band-narrowing efficiency.

(1) As shown in the row (a) in the table shown in FIG. 4, the electrode width of the ArF laser device shown in FIG. 3 was set to 2 mm, and the inter-electrode distance was set to 13 mm.

Ne (neon) was used as the buffer gas, and the gas flow rate was set to 45 msec (the driving power of the fan motor was set to 4.5 kW) so that the output energy was 5 mJ. As a result, stable oscillation was possible at 10 kHz without deteriorating the band-narrowing efficiency.

(2) As shown in the row (b) in the table of FIG. 4, the electrode width of the ArF laser device shown in FIG. 3 was set to 2 mm, and the inter-electrode distance was set to 13 mm.

He (helium) was used as the buffer gas, and the gas flow rate was set to 45 msec (the driving power of the fan motor was set to 3 kW) so that the output energy was 5 mJ. As a result, stable oscillation was possible at 10 kHz.

What is claimed is:

1. A narrow-band discharge excited laser device comprising:
    a laser chamber having
        a laser gas sealed therein,
        a pair of electrodes provided therein, the pair of electrodes facing each other with a predetermined inter-electrode distance therebetween, and the pair of electrodes each having a width of 1 mm to 2 mm, and
        a cross-flow fan for circulating the laser gas passing between the pair of electrodes;
    a high-voltage power supply connected to the pair of electrodes; and
    a band-narrowing module having a magnifying prism, a slit, and a grating;
    wherein the band-narrowing module receives laser light generated by the laser chamber that passes through the slit,
    wherein the high-voltage power supply applies a pulsed voltage to the pair of electrodes to generate electric discharge between the electrodes, and
    wherein a ratio between the width of each of the pair of electrodes and the predetermined inter-electrode distance (electrode width/inter-electrode distance) is 0.25 to 0.125.

2. The narrow-band discharge excited laser device according to claim 1, wherein the slit of the band-narrowing module has a width of 2 mm or less.

3. The narrow-band discharge excited laser device according to claim 1, wherein the high-voltage power supply applies the pulsed voltage to the pair of electrodes at a repetition rate of 10 to 20 kHz.

4. The narrow-band discharge excited laser device according to claim 2, wherein the high-voltage power supply applies the pulsed voltage to the pair of electrodes at a repetition rate of 10 to 20 kHz.

5. A two-stage laser device comprising:
    an oscillation stage laser (MO); and
    an amplifier (PA) or an amplification stage laser (PO),
    wherein the oscillation stage laser is the narrow-band discharge excited laser device according to claim 1.

6. A two-stage laser device comprising:
    an oscillation stage laser (MO); and
    an amplifier (PA) or an amplification stage laser (PO),
    wherein the oscillation stage laser is the narrow-band discharge excited laser device according to claim 2.

7. A two-stage laser device comprising:
    an oscillation stage laser (MO); and
    an amplifier (PA) or an amplification stage laser (PO),
    wherein the oscillation stage laser is the narrow-band discharge excited laser device according to claim 3.

8. A two-stage laser device comprising:
    an oscillation stage laser (MO); and
    an amplifier (PA) or an amplification stage laser (PO),
    wherein the oscillation stage laser is the narrow-band discharge excited laser device according to claim 4.

* * * * *